(No Model.)
J. RICHTER.
GLOBE VALVE.
No. 263,224. Patented Aug. 22, 1882.
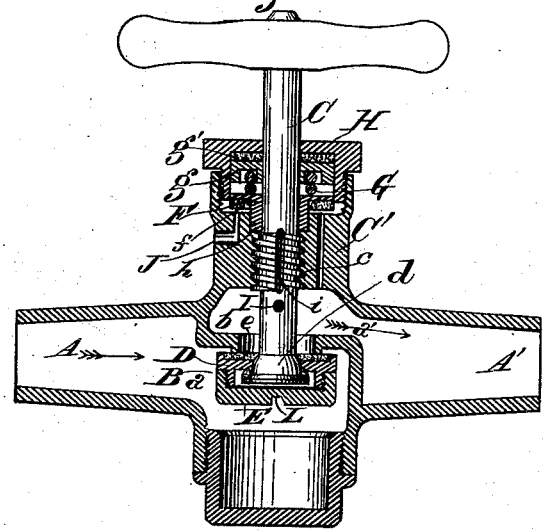
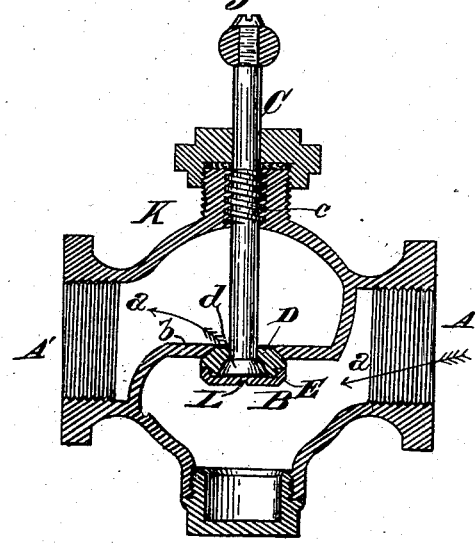
Attest,
Jno. E. Giles.
Jno. E. Jones.
Inventor,
Joseph Richter
by Woods Boyd
his Attorneys &c.

UNITED STATES PATENT OFFICE.

JOSEPH RICHTER, OF CINCINNATI, OHIO.

GLOBE-VALVE.

SPECIFICATION forming part of Letters Patent No. 263,224, dated August 22, 1882.

Application filed May 20, 1882. (No model.)

*To all whom it may concern:*

Be it known that I, JOSEPH RICHTER, a citizen of the United States, and a resident of Cincinnati, in the county of Hamilton and State of Ohio, have invented certain new and useful Improvements in Globe-Valves and Water-Cocks, of which the following is a specification.

This invention relates to improvements in globe-valves and water-cocks, and has for its objects to provide a double-seated swiveling valve which effectually prevents leakage, and to provide a valve elevated by a screw-thread on the valve-stem and depressed by a spring for opening and closing a wash-aperture in the valve-casing. These objects I accomplish by the construction and arrangement of parts illustrated in the accompanying drawings, in which—

Figure 1 represents a vertical central sectional view of a valve or cock embodying my invention, and Fig. 2 a vertical central sectional view of a modification.

A represents the inlet, and A' the outlet, end of the cock; $a$, the inlet-port, and $a'$ the outlet-port; B, the valve, and $b$ the diaphragm against which the valve seats; C, the valve-stem; $c$, a screw-thread chased on the stem, engaging with a female thread cut in the bore of the valve-shell above the diaphragm $b$. The valve B is made of two parts, D representing an annular disk-valve which seats against the diaphragm $b$; $d$, the head of the valve-stem, on which the disk rests loosely, so as to swivel, and the disk and head $d$ are trued or fitted so that the latter will seat against the disk-valve D and form a double swiveling seated valve.

E represents a cap screwing upon the outer periphery of the disk D, and covering the seat of the valve-stem upon the disk, and against which the head of the valve-stem presses to force the disk-valve open against the pressure. $e$ represents a packing placed between the disk and diaphragm.

Above the point where the stem C taps the diaphragm or barrel C' is placed a waste-valve, F, which is provided with a packing, $f$.

G represents a spring coiled around the stem C to hold the waste-valve down when the valve B is open. $g$ represents a packing-ring, and $g'$ a packing between the ring $g$ and the cap H, which form the journal for the stem C.

Valve F has a downward-projecting annular flange, $h$, which rests on a projection or shoulder formed by the screw-threads, or a collar may be fixed on the stem C for the same purpose. As valve B is closed by unscrewing the stem C the shoulder on the stem comes in contact with the flange $h$ and raises the valve F off its seat. A waste-conduit leading from the port $a'$ to the chamber below the valve F is provided. I have two ways of making the wasteway—one by a groove, $i$, cut longitudinally through the thread $c$ of the stem, and another by making the stem hollow, or piercing a hole through the stem.

J represents an outlet for the waste.

L represents a slot in which a screw-driver may be inserted to regrind the valve. When the valve is to be reground it is forced off its seat a slight distance, and, being swiveled on its stem it can be readily turned to regrind the same. This is a very important advantage.

The waste valve herein described is forced off its seat by the screw on the stem of the valve, and the waste is made positive by the closing of the cock at all times.

I claim—

1. The combination of the valve-stem C, provided at its lower end with the head $d$ of the disk D, resting and swiveled on said head, and the cap E, secured to the periphery of the disk and confining the head of the valve-stem between said disk and cap, substantially as described.

2. The combination of the valve-casing having the internally-threaded bore C', the valve-stem C, having a screw-thread fitted to the bore, the valve F, arranged above the bore and elevated by the thread on the valve-stem, and a spring, G, arranged above the valve to press the latter upon its seat on the bore, substantially as described.

In testimony whereof I have hereunto set my hand in the presence of two subscribing witnesses.

JOSEPH RICHTER.

Witnesses:
JNO. E. JONES,
J. H. CHARLES SMITH.